United States Patent
Schneuwly et al.

(10) Patent No.: US 12,481,632 B1
(45) Date of Patent: Nov. 25, 2025

(54) PAYLOAD SIZE REDUCTION AND REASSEMBLY OF RECURSIVELY PARSABLE STRUCTURES

(71) Applicant: Oracle International Corporation, Redwood Shores, CA (US)

(72) Inventors: Arno Schneuwly, Effretikon (CH); Felix Schmidt, Baden-Dattwil (CH); Saeid Allahdadian, Vancover (CA); Matteo Casserini, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/671,192

(22) Filed: May 22, 2024

(51) Int. Cl.
*G06F 16/22* (2019.01)
*G06F 16/81* (2019.01)

(52) U.S. Cl.
CPC .......... *G06F 16/2246* (2019.01); *G06F 16/81* (2019.01)

(58) Field of Classification Search
CPC .. G06F 16/2228; G06F 16/2246; G06F 16/81; G06F 16/83; G06F 16/84
See application file for complete search history.

(56) References Cited

U.S. PATENT DOCUMENTS

| | | | | |
|---|---|---|---|---|
| 8,032,860 | B2* | 10/2011 | Piehler | G06F 40/10 717/110 |
| 9,251,228 | B1* | 2/2016 | Iyer | G06F 16/9577 |
| 10,089,343 | B2 | 10/2018 | Azoulay | |
| 2002/0029229 | A1* | 3/2002 | Jakopac | G06F 16/9017 707/E17.037 |
| 2002/0188613 | A1* | 12/2002 | Chakraborty | G06F 16/80 |

(Continued)

FOREIGN PATENT DOCUMENTS

KR 100930108 11/2009

OTHER PUBLICATIONS

Zhou, Exploiting Structure Recurrence in XML Processing, 2008 Eighth International Conference on Web Engineering, Yorktown Heights, NJ, USA, 2008, pp. 311-324, doi 10.1109ICWE.2008.46. (Year: 2008).*

(Continued)

*Primary Examiner* — James E Richardson
(74) *Attorney, Agent, or Firm* — Hickman Becker Bingham Ledesma LLP (57) ABSTRACT

Here is message compression using schema inference for condensing semantic content by removal of syntactic structure in multiple kinds of content. Topological structures of different trees are generalized to generate a merged tree. Because compression discards redundant content and often only semantic content is retained, the signal-to-noise ratio is increased, which increases accuracy of downstream semantic analytics such as machine learning. Compression based on the merged tree removes redundant information from new messages that, without obscuring semantic content, decreases the data volume for downstream analytics or archiving. This compression extracts semantic values that can be assembled into a sequence of lexical tokens that is suitable for natural language processing (NLP), and the sequence of lexical tokens does not contain tokens that represent syntax or structure. Thus, compression provides fewer tokens to be processed by a downstream language model, which is suitable for efficient processing of a live data stream.

25 Claims, 5 Drawing Sheets

(56) References Cited

U.S. PATENT DOCUMENTS

| | | | |
|---|---|---|---|
| 2008/0168345 A1* | 7/2008 | Becker | G06F 16/986 |
| | | | 715/242 |
| 2011/0302510 A1* | 12/2011 | Harrison | G06F 40/134 |
| | | | 715/781 |
| 2017/0255611 A1* | 9/2017 | Kubosawa | G06F 40/30 |
| 2018/0268081 A1* | 9/2018 | Kearney | G06F 40/284 |
| 2020/0050604 A1 | 2/2020 | Tung et al. | |
| 2021/0185066 A1* | 6/2021 | Shah | G06N 3/08 |
| 2022/0180863 A1* | 6/2022 | De Paiva | G06F 16/3329 |
| 2022/0197917 A1 | 6/2022 | Schneuwly et al. | |
| 2022/0261228 A1 | 8/2022 | Schneuwly et al. | |
| 2023/0113558 A1 | 4/2023 | Johnson et al. | |

OTHER PUBLICATIONS

Vijayanagulu, "Spark 3.0 Feature—Dynamic Partition Pruning (DPP) to avoid scanning irrelevant Data" https://medium.com/@prabhakaran.electric/spark-3-0-feature-dynamic-partition-pruning-dpp-to-avoid-scanning-irrelevant-data-1a7bbd006a89 (Jul. 28, 2020).

Joshi, "Leveling Up One's Parsing Game With ASTs", https://medium.com/basecs/leveling-up-ones-parsing-game-with-asts-d7a6fc2400ff (Dec. 5, 2017).

Anam et al., "Schema Mapping Using Hybrid Ripple-Down Rules" Proceedings of the 38th Australia Computer Science Conference, 10 pages (Jan. 27-30, 2015).

Shah et al., "R2D2: Reducing Redundancy and Duplication in Data Lakes" Proc. ACM Manag. Data 1, 4 (SIGMOD), Article 268. (Dec. 20, 2023) 25 pages.

Niehren, Joachim, et al. "Query induction with schema-guided pruning strategies." The Journal of Machine Learning Research 14.1 (2013): 927-964.

Maduko, Angela Ifeyinwa, et al. Graph summaries for optimizing graph pattern queries on rdf databases. Diss. University of Georgia, 2009.

Blume, Till. Semantic structural graph summaries for evolving and distributed graphs. Diss. Universität Ulm, 2022.

"MSIT-116C: Data Warehousing and Data Mining" downloaded Jan. 4, 2024 ining http://repo.darmajaya.ac.id/5114/1/Data%20Warehousing%20and%20Mining%20%28%20PDFDrive%20%29.pdf—Karnataka State University (2014) 341 pages.

* cited by examiner

PAYLOAD SIZE REDUCTION AND REASSEMBLY OF RECURSIVELY PARSABLE STRUCTURES

FIELD OF THE INVENTION

The present invention relates to message compression. Herein is schema inference for condensation of semantic content by removal of syntactic structure.

BACKGROUND

Structured or semi-structured content may occur in various more or less complicated formats such as a webpage, a network message, or a console log entry. For example, a webpage may contain artifacts that specify visual design such as images, colors, fonts, layout, and styling. The webpage may also contain artifacts that specify structuring of content for clarity and organization such as headings, paragraphs, and lists to guide a human reader. The webpage may also contain semantic and topical information such as natural language (e.g. prose). The webpage may also contain artifacts that specify dynamic functionality such as forms, buttons, and JavaScript.

Thus, content may be a complex mix of artifacts, and each artifact is dedicated to a particular engineering or usability concern. For example, hypertext markup language (HTML) may contain many or mostly artifacts that are repetitive and that specify syntactic or cosmetic structure instead of specifying semantics. For example, software that semantically analyzes a webpage may spend much or most of its time sifting through semantically irrelevant artifacts in the webpage. In other words, the webpage itself is semantically sparse (i.e. wasteful of storage space), where non-semantic artifacts in the webpage are more or less semantically noisy (i.e. low information). Thus, the webpage may have a low signal-to-noise ratio that may, for example, decrease the accuracy of a machine learning model that semantically analyzes the webpage. HTML version four may be referred to as XHTML (XML HTML) because it is an XML dialect. Wikipedia summarizes, "XML and its extensions have regularly been criticized for verbosity, complexity and redundancy."

Generic compression such as zipping may significantly compress a data container such as a message, a document, or a webpage. A data format such as JavaScript object notation (JSON) contains so much non-semantic material, including whitespace and punctuation, that zipped JSON typically has a high compression ratio that is from 50 to 95 percent in practice, which indicates undesirable sparsity despite terseness being a design goal and supposed strength of JSON. However, zipped data is opaque, which means that the syntax and semantics within the data container are no longer available for inspection and analysis. For example, model training is unlikely to converge if feature vectors primarily contain zipped content. In the state of the art are two major technical challenges. The first is that compression obscures semantics. The second is that individual webpages, for example, are likely to internally be structurally dissimilar from each other, which may interfere with learned or heuristic analytics such as pattern recognition. Thus, diversity and sparsity of content are not well handled by the state of the art, which may degrade objective and quantitative performance characteristics of internal operation of an analytic computer such as decreased accuracy and reliability and increased latency and storage demand.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Here is message compression using schema inference for condensation of semantic content by removal of syntactic structure. Common textual formats to transfer data in computer networks are recursively parsable tree structures such as JavaScript object notation (JSON), extensible markup language (XML), and hypertext markup language (HTML). This approach uses a recursively parsable tree structure for structured and heterogenous content with different parsable content types and formats. For example, a parsed HTML tree may contain natural language, JavaScript, JSON, and many other kinds of content. In this approach, each kind of content may be separately parsed by a respective specialized parser to generate a forest of subtrees that herein may be inserted into the parsed HTML tree. In another example, hypertext transfer protocol (HTTP) traffic includes header and body information for requests and responses. By the protocol definition, information may include nested (i.e. recursively parsable) key-value pairs. Therefore, each HTTP message is processed herein as a recursively parsable tree structure.

An embodiment may analyze, at scale, a massive stream of recursively parsable structures that is emitted by a source such as a web application. When processing a data stream, redundancy lacking semantic information may be a significant part of the data content that frequently repeats within a single message and across multiple messages. Due to repetition in the data stream, components of parse trees are expected to be redundant. Herein is novel schema inference that merges the topological structure of different parse trees to generate a global schema tree that contains static components and accommodates dynamic components. The dynamic components are subtrees which do not occur frequently, and the static components are subtrees which appear frequently in multiple individual trees being merged during schema inference.

This is a novel way to efficiently to extract static and dynamic components of recursively parsable tree structures. This approach may be a preprocessing step to decrease data volume, which may conserve time and space of computer(s) such as decreased volatile and nonvolatile storage space, decreased network transfer latency, and decreased computational latency. Unlike other compression techniques, this approach does not obscure content semantics as discussed in the Background, which means that compressed content may be directly consumed by downstream analytic applications. Because redundant content is discarded and often only semantic content is retained during compression, the signal-to-noise ratio is increased, which increases accuracy of semantic analytics such as machine learning as discussed in the Background.

This approach has at least the following innovations. By novel schema inference, a sequence of messages in application traffic is generalized as a large and universal schematic tree that more or less describes the data topology of all of the messages, and this tree is referred to herein as a merged tree. By novel compression based on the merged tree, redundant information is removed from new messages that, without obscuring semantic content, decreases the data volume for downstream analytics or archiving. This approach is suitable for analyzing or recording a data stream containing terabytes per day.

This approach has at least the following advantages. This novel compression is a lightweight and straightforward approach to decrease payload size of a data stream that contains redundancies. As discussed herein, this compression extracts semantic values that can be assembled into a sequence of lexical tokens that is suitable for natural language processing (NLP) such as by a large language model (LLM) such as bidirectional encoder representations from transformers (BERT). This compression generates a sequence of lexical tokens that does not contain non-semantic tokens such as punctuation, whitespace, nor tokens that represent syntax or structure. Thus, compression provides fewer tokens to be processed by a downstream language model, which is suitable for efficient processing of a live data stream such as for anomaly detection. The following are exemplary machine learning activities that may be synergistically combined with techniques herein.

Because this compression may generate both a parse tree and a sequence of lexical tokens, this compression may be used with any of the machine learning techniques, including pretraining and multitask learning, presented in related U.S. patent application Ser. No. 18/235,461 GRAPH PATH PREDICTION AND MASKED LANGUAGE MODELLING JOINT TRAINING ALGORITHM FOR LANGUAGE MODELS filed on Aug. 18, 2023 by Tomas Feith et al, which is incorporated in its entirety herein.

Because this compression may generate both a parse tree and a sequence of lexical tokens, this compression may be used with any of the machine learning techniques, including finetuning, presented in related U.S. patent application Ser. No. 18/202,564 TRAINING SYNTAX-AWARE LANGUAGE MODELS WITH AST PATH PREDICTION filed on May 26, 2023 by Pritam Dash et al, which is incorporated in its entirety herein.

1.0 Example Computer

Figure 1:
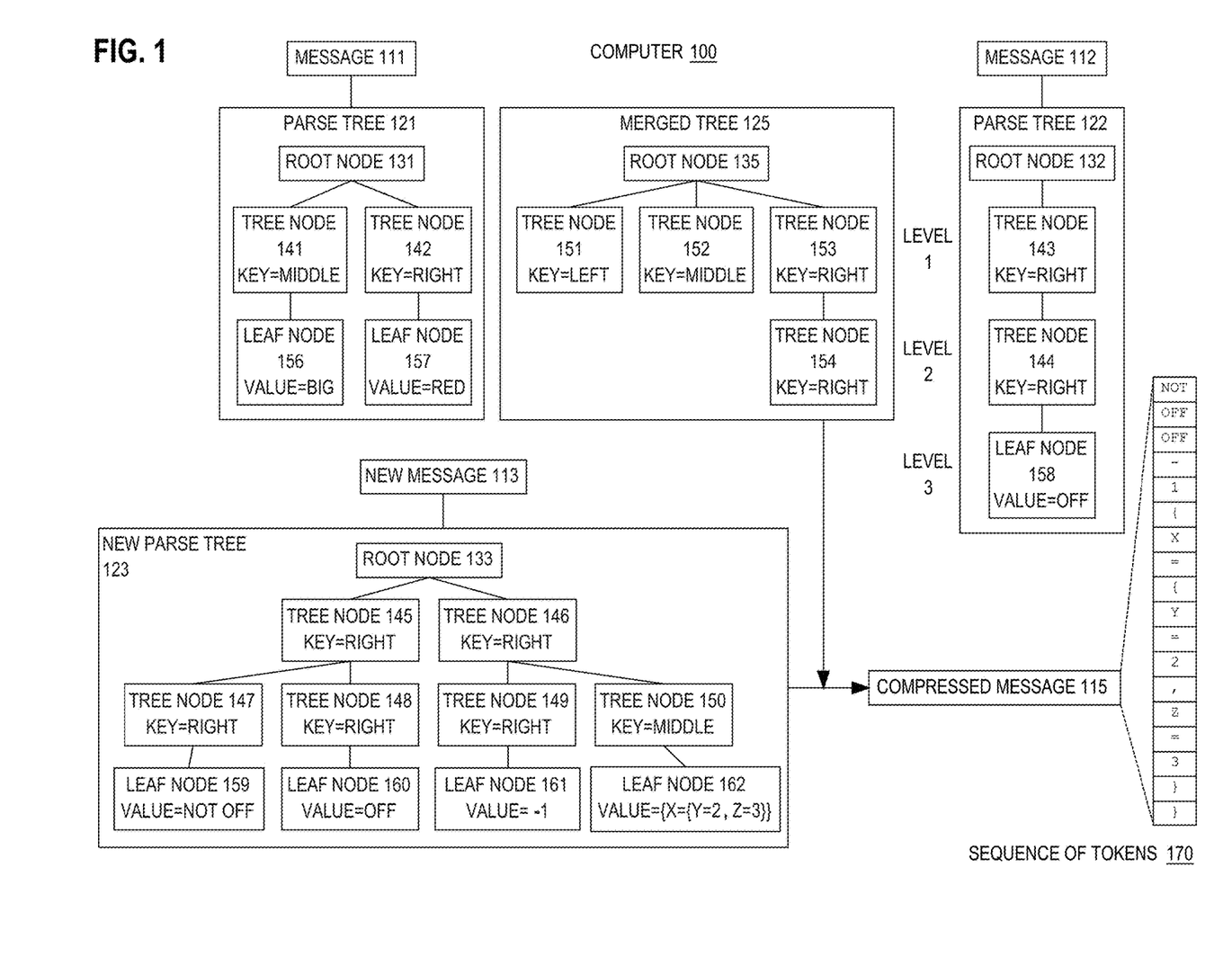
FIG. 1 is a block diagram that depicts an example computer that compresses messages using schema inference for condensation of semantic content by removal of syntactic structure.

FIG. 1 is a block diagram that depicts an example computer 100. To compress messages, computer 100 uses schema inference for condensation of semantic content by removal of syntactic structure. Computer 100 may be one or more of a rack server such as a blade, a personal computer, a mainframe, or a virtual computer. All of the components shown in FIG. 1 may be stored and operated in volatile or nonvolatile storage of computer 100.

The lifecycle of computer 100 consists of a schema inference phase followed by a message compression phase, and these phases may occur on same or separate respective computers. To generate merged tree 125, the schema inference phase analyzes a corpus that consists of many messages 111-112. After the schema inference phase, merged tree 125 may be operated as a universal message schema that can partially or completely describe the structure of, for example, new message 113.

1.1 Parse Tree of Message

Depending on the embodiment, each of messages 111-113 may be a webpage, a stylesheet, a body of a hypertext transfer protocol (HTTP) post, a log entry, an email, JavaScript, Python, a Python notebook, or a semi-structured document such as JavaScript object notation (JSON) or extensible markup language (XML). In examples discussed later herein, some or all of messages 111-113 may each contain a mix of multiple content types. In various examples, messages 111-113 may consist entirely of text or some or all of messages 111-113 may each contain a mix of text and unencoded binary content.

Each of messages 111-113 contain multiple key-value pairs that are extracted during parsing. Parsing messages 111-112 occurs during the schema inference phase. Parsing message 113 occurs during the message compression phase discussed later herein. Parsing messages 111-113 generates respective parse trees 121-123 that each contains exactly one respective root node 131-133.

Parse trees 121-123 are logical trees in random access memory (RAM) of computer 100. Various embodiments may specially process root nodes in some or all of the following ways. For example, a root node may or may not be synthetic and may or may not correspond to any particular content in a message from which a parse tree is generated. Root nodes may more or less be ignored during tree analytics. Root nodes may be more or less identical.

Parse trees 121-123 consists of tree nodes that are interconnected by undirected edges. In various embodiments, a parse tree may be an abstract syntax tree (AST) or a document object model (DOM). Tree nodes may be non-contiguously stored in RAM such as in a fragmented heap. An edge may be a reference to exactly one tree node, and edge(s) may be stored in a tree node. For example, root node 131 may contain edges that are references (e.g. memory pointers or array offsets) to tree nodes 141-142.

Parse trees 121-123 may internally be logically arranged in a sequence of many tree levels 1-3. For example, level 1 contains tree nodes 141-143 and 151-153 in trees 121-122 and 125 as shown. A tree node in a level can only be directly connected by edges to tree nodes in adjacent level(s). For example, tree node 144 in level 2 is connected to tree nodes 143 and 158 in adjacent levels 1 and 3. A tree node cannot be directly connected to another tree node in a same level or in a non-adjacent level. For example, tree nodes—141-142 that are in same level 1 cannot be directly connected to each other. Likewise, tree nodes 143 and 158 cannot be directly connected to each other because they are in non-adjacent levels 1 and 3.

Two tree nodes can be directly connected by an edge only when one node is a parent node and the other node is a child node that is further from the root node than the parent node is. Herein, levels 1-3 are enumerated downwards from top to bottom such that level 1 is a first level or top level, and level 3 for example is a last level or bottom level. Root nodes 131-133 may be in an implied level 0 that is not processed herein. Depending on the embodiment, the child node or the parent node or both nodes may contain a reference (i.e. edge) to the other node.

A parent node may have one or multiple child nodes in a same level. For example, root node 131 has two child nodes 141-142 in level 1. In other words, root node 131 is the parent node of child nodes 141-142.

A leaf node is the only kind of tree node that does not have a child node. A root node is the only kind of tree node that does not have a parent node. An intermediate node is the only kind of tree node that has a parent node and child node(s). For example, tree nodes 141-144 are intermediate nodes.

In this example, parse trees 122-123 have a same count of levels, and parse tree 121 has a different count of levels. The count of levels in a parse tree is somewhat orthogonal (i.e. independent) to the count of tree nodes in the parse tree. For example, parse tree 121 contains more tree nodes than parse tree 122, but parse tree 122 contains more levels than parse tree 121. Although not shown, an imbalanced parse tree may have leaf nodes in different levels, so long as those leaf nodes have different parent nodes.

1.2 Key-Value Pair

Herein, only leaf nodes contain values, and each leaf node contains exactly one (e.g. non-distinct) value. Although in the message compression phase, a downstream software application might constrain datatypes and/or value ranges of leaf values, herein any datatype of leaf values is supported, including an unencoded binary value such as a binary large object (BLOB).

Herein, only intermediate nodes contain keys, and each intermediate node contains exactly one key. Herein, a parent-leaf pair consists of a leaf node and its parent intermediate node. In the shown embodiment, each distinct leaf node is contained in a distinct parent-leaf pair. In a parent-leaf pair, the parent node contains a key, and the leaf node contains a value. Thus, a parent-leaf pair represents a key-value pair. A parse tree contains leaf-parent pair(s), which means that a parse tree contains key-value pairs. For example, parse tree 122 contains only one parent-leaf pair, which contains tree nodes 144 and 158 that represent a key-value pair whose key is right and whose value is off.

A key-value pair in a parse tree may represent a key-value pair in JSON in a message. For example, message 111 may be the following JSON text that is a well-formed (i.e. parseable) document that contains two key-value pairs.

{
  "middle": "big",
  "right": "red"
}

A key-value pair in a parse tree may represent a key-value pair in XML in a message in the following ways. In one example, message 111 may be the following XML text that is a well-formed document that contains two key-value pairs, and root node 131 may or may not be a synthetic (i.e. added) tree node. In this example, middle is an element (a.k.a. tag), and big is element content (a.k.a. text). For example, a key may be an HTML tag or, shown below, an XML tag.

<root>
  <middle>big</middle>
  <right>red</right>
</root>

In another example, message 111 may be the following XML text that is a well-formed document that contains two key-value pairs. In this example, middle is an attribute, and big is an attribute value. In this example, parsing explodes (i.e. expands) an attribute to generate a parent-leaf pair, where the parent tree node represents the attribute, and the leaf tree node represents the attribute's value.

<root middle="big" right="red" />

1.3 Tree Topology

Although in the message compression phase, a downstream software application might require that a key is unique, for techniques herein a key is not unique. For example, distinct parse trees 121-122 contain same key right. Likewise, distinct levels 1-2 contain same key right in parse tree 122. Likewise, same level 1 in new parse tree 123 contains same key right twice.

Although in the message compression phase, a downstream software application might require various topological limits on a parse tree used to generate either of artifacts 115 or 125, herein an embodiment might have no topological limits on parse trees. In an embodiment, there are no maximum counts of: a) tree levels that a parse tree may contain, b) tree nodes that a tree level may contain, c) tree nodes that a parse tree may contain, d) child nodes that a parent node may have, e) leaf nodes that a parse tree may contain, f) distinct keys in a tree level or parse tree, g) parse trees that contain a same key, and h) occurrences of a same key in a tree level or parse tree.

1.4 Merged Tree Generated from Schema Inference Corpus

The schema inference phase generates merged tree 125 that is an automatically inferred schema that describes the structure (i.e. syntax) of messages 111-112 and their parse trees 121-122 as follows. Generation of merged tree 125 entails either a preorder or breadth-first traversal of the tree nodes in each of parse trees 121-122 in the corpus. Traversing always starts at the root node (e.g. without processing the root node). In a preorder traversal, leaf node 156 is visited (i.e. processed) after its parent tree node 141 and before tree node 142. In a breadth-first traversal, tree node 142 is instead visited before leaf node 156 and after tree node 141.

Multiple parse trees 121-122 may be sequentially or concurrently processed. In either a preorder or breadth-first traversal, tree nodes 143-144 and 158 are processed in the shown vertically descending ordering as follows. Regardless of kind of traversal, each tree node has a tree path that is a sequence of one or more tree nodes that extends from the root node to the tree node. Herein, a tree path is a sequence of the keys of the path's sequence of tree nodes. Herein, a tree path does not extend to a leaf node. In parse tree 122, the longest tree path is root→right→right. New parse tree 123 contains three occurrences of tree path root→right→right, including two occurrences that contain same tree node 145.

Initially merged tree 125 is empty or contains only root node 135. When visiting a current intermediate tree node in one of corpus parse trees 121-122, computer 100 detects whether or not merged tree 125 contains the tree path of the current node. For example, the tree path of tree nodes 142-143 and 153 is root→right. Only if merged tree 125 did not contain that tree path and did not contain tree node 153, then that tree path and tree node 153 would be created in merged tree 125 when, for example, tree node 142 is visited but not later when tree node 143 is eventually visited.

A corpus parse tree not shown contains an intermediate tree node whose key is left, which is why merged tree 125 contains tree node 151. Thus, merged tree 125 incrementally grows an additional tree path to an additional tree node each time a distinct tree path is discovered in corpus parse trees 121-122. In that way, the schema inference phase generates merged tree 125, and the schema inference phase ceases when all intermediate tree nodes in all corpus parse trees 121-122 are processed. Merged tree 125 may contain some or all of the distinct keys that occur in corpus parse trees 121-122 and, as shown, merged tree 125 may contain more distinct keys than distinct keys contained in each of individual corpus parse trees 121-122. For example as shown, merged tree 125 contains three distinct keys, but parse tree 121 contains only two distinct keys, and parse tree 122 contains only one distinct key.

1.5 Message Compression Based on Merged Tree

After the schema inference phase, the corpus may be discarded including messages 111-112 and parse trees 121-122. Merged tree 125 is retained for read-only use in the message compression phase. Merged tree 125 can be reused to compress many messages of many topologies, including a topology that did not occur in the corpus. For example, root node 133 has multiple child nodes whose key is right, and multiplicity in that particular way did not occur in corpus parse trees 121-122.

In the shown scenario in the message compression phase, merged tree 125 is used to generate compressed message 115 that represents new message 113. Herein, a key-value path is the tree path of the parent tree node of a parent-leaf pair as discussed above. For example, parse tree 122 contains only one key-value path (i.e. root→right→right). The message compression phase processes, in document order, each key-value path in new parse tree 123. Herein, document order means that key-value paths have the same ordering as the leaf values occur in the message. For example, leaf node 159 is the first leaf node in new parse tree 123, and leaf node 162 is the last leaf node.

Compressed message 115 initially is empty. Into compressed message 115 in document order, each leaf value is copied. No keys are copied into compressed message 115, which provides compression. In a compression scenario not shown, message 111 is a new message instead of a corpus message, and message 111 may be the following JSON.

{
 "middle": "big",
 "right": "red"
}

In that case, message 111 contains four words, for which a compressed message is generated that contains only two words that are leaf values big and red. Thus compression may decrease a word count by half.

1.6 Sequence of Lexical Tokens for Natural Language Processing (NLP)

In the message compression phase, a downstream software application may be natural language processing (NLP) such as a large language model (LLM) such as bidirectional encoder representations from transformers (BERT) that accepts an input that consists of a sequence of lexical tokens. For example, the above JSON contains punctuation characters such as curly braces, colons, and a comma that each may be represented by a separate lexical token, and the above JSON contains more punctuation than words.

Thus, compression that removes lexical tokens (i.e. words and punctuation) can achieve more compression than compression that only removes words. In many scenarios, no punctuation is copied into a compressed message, which provides compression. When the above JSON is compressed into a sequence of lexical tokens, the compressed message contains a sequence of only two lexical tokens that are leaf values big and red. Thus compression may decrease a token count by more than half.

In an embodiment, the shown dashed lines demonstrate that compressed message 115 consists of sequence of tokens 170 that is a one-dimensional array of lexical tokens that occur in new message 113. Herein, a lexical token has a text string value, such as an array of characters. Because not all lexical tokens are copied into sequence of tokens 170, message 115 is compressed as discussed below. Herein, generation of a lexical token may entail copying of a leaf value by reference or by value. Herein, generation of a leaf value may entail copying, from a message, a text field or a substring by reference or by value.

In the message compression phase, key-value paths are processed in document order. Computer 100 detects whether the current key-value path occurs in merged tree 125 and, if so, the leaf value is copied into sequence of tokens 170. As shown, leaf nodes 159-161 have key-value paths that occur in merged tree 125.

Lexical tokens in sequence of tokens 170 are ordered vertically descending as shown. That is, not is the first token, and } (i.e. right curly brace) is the last token. In the shown embodiment, one or multiple lexical tokens are generated per leaf value. For example, leaf node 159 contains two words separated by a space character. Thus, not and off are the first two tokens in sequence of tokens 170. Leaf node 160 instead provides only one lexical token in sequence of tokens 170.

1.7 Selective Parsing and Compression

New parse tree 123 contains tree path root→right→middle that did not occur in corpus parse trees 121-122, and that tree path does not occur in merged tree 125. Computer 100 does not process any tree paths that contain, as a sub-path, a tree path that does not occur in merged tree 125. Because the tree path of tree node 150 is not in merged tree 125, tree node 150 is the root of an unprocessed subtree, which is why the value of leaf node 162 is, in this example, unparsed JSON that is copied, without compression, into compressed message 115. Shown in sequence of tokens 170 are two adjacent tokens—and 1, and all tokens after (i.e. below) those two tokens are unprocessed (i.e. not compressed). Thus, compressed message 115 may contain a mix of compressed and uncompressed content, and sequence of tokens 170 may alternate back and forth between tokens subsequences that are compressed or uncompressed, based on which tree paths in new parse tree 123 do or do not occur in merged tree 125. Selective parsing and special parsing techniques are discussed later herein.

2.0 Example Message Compression Process

Figure 2:
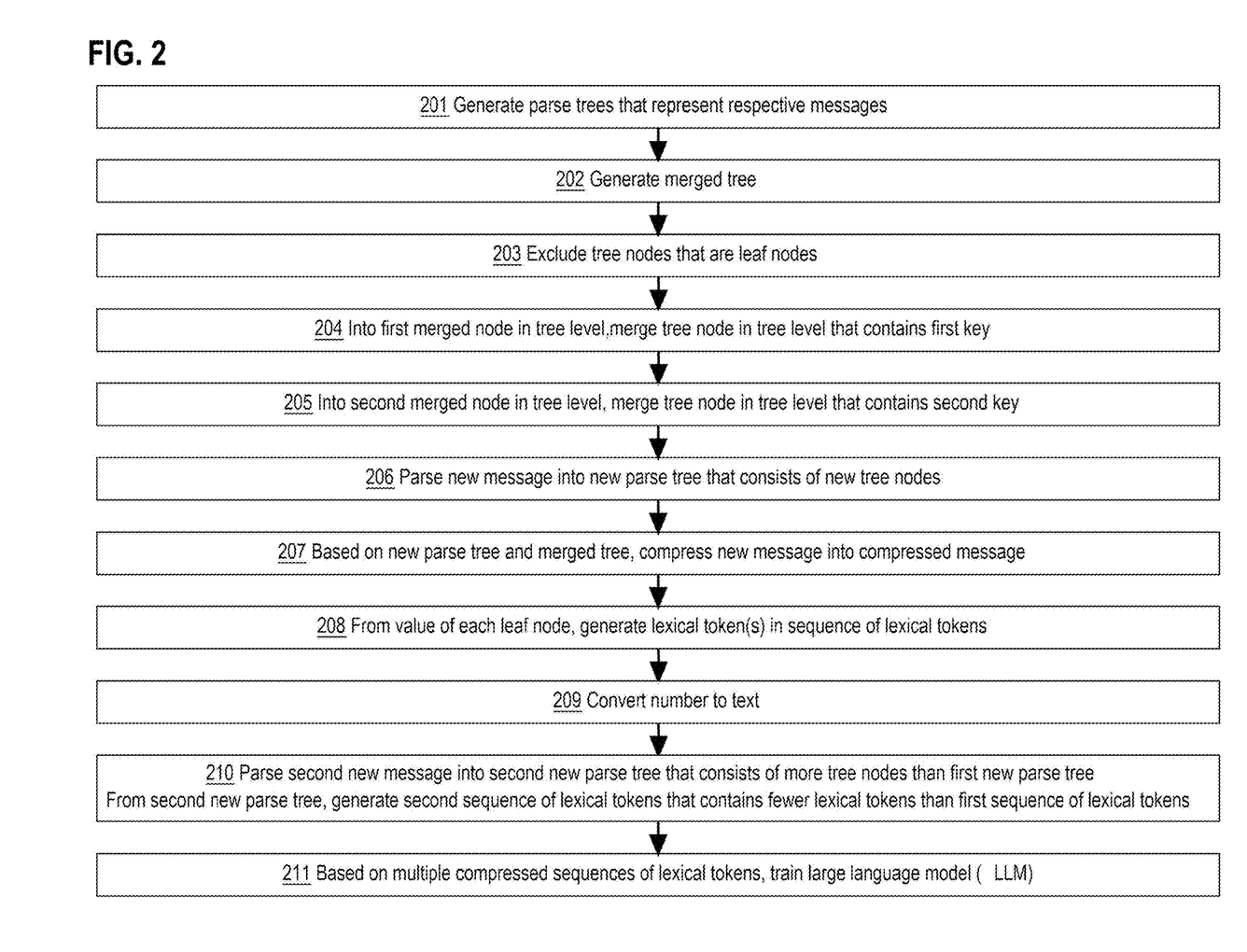
FIG. 2 is a flow diagram that depicts an example computer process that compresses messages by using schema inference for condensation of semantic content by removal of syntactic structure.

FIG. 2 is a flow diagram that depicts an example process that any computer herein may perform to compress messages by using schema inference for condensation of semantic content by removal of syntactic structure. As discussed earlier herein, the lifecycle of computer 100 has a schema inference phase followed by a message compression phase. The schema inference phase performs steps 201-205.

2.1 Schema Inference Phase

Step 201 parses all of corpus messages 111-112 to generate respective parse trees 121-122.

Step 202 generates merged tree 125 by traversing tree nodes of corpus parse trees 121-122 as discussed earlier herein. Steps 203-205 are sub-steps of step 202. Step 203 excludes (i.e. does not process) tree nodes in corpus parse trees 121-122 that are leaf nodes as discussed earlier herein.

As discussed earlier herein, merged tree 125 is initially empty, and a tree node is inserted into merged tree 125 whenever a distinct new tree path is discovered from the root tree node to an intermediate tree node in one of corpus parse trees 121-122. Thus, merged tree 125 may become already populated with some tree nodes before steps 204-205 that perform merging of tree nodes in various ways.

In the following scenarios, steps 204-205 each merges a respective distinct intermediate tree node of the corpus into an existing tree node in merged tree 125. Each of these scenarios entails exactly two distinct intermediate tree nodes from the corpus.

A first shown scenario: a) involves one existing tree node 153 in one tree level 1 with one key right, and b) two intermediate tree nodes 142-143 in respective corpus parse trees 121-122 that c) by respective steps 204-205 are merged into same tree node 153.

A second shown scenario: a) involves two existing tree nodes 152-153 in one tree level 1 with two respective keys middle and right, and b) two intermediate tree nodes 141 and 143 in respective corpus parse trees 121-122 that c) by respective steps 204-205 are merged into respective tree node nodes 152-153.

A third shown scenario: a) involves two existing tree nodes 152-153 in one tree level 1 with two respective keys middle and right, and b) two intermediate tree nodes 141-142 in one corpus parse tree 121 that c) by respective steps 204-205 are merged into respective tree node nodes 152-153.

A fourth shown scenario: a) involves two existing tree nodes 153-154 in two respective tree levels 1-2 with one key right, and b) two intermediate tree nodes 143-144 in one corpus parse tree 122 that c) by respective steps 204-205 are merged into respective tree node nodes 153-154.

A fifth shown scenario: a) involves two existing tree nodes 152 and 154 in two respective tree levels 1-2 with two respective keys middle and right, and b) two intermediate tree nodes 141 and 144 in in respective corpus parse trees 121-122 that c) by respective steps 204-205 are merged into respective tree node nodes 152 and 154.

In other words for various parse trees in a corpus, step 204 and/or 205 may be individually repeated with various combinations of key(s) and tree level(s) to cause various merges of various tree nodes. In an embodiment, an individual merge of a tree node by step 204 or 205 is conditioned on a count of occurrences of the tree node's tree path in the corpus exceeding a an absolute threshold or a relative (e.g. percent frequency) threshold. After all possible merges occur while traversing all intermediate tree nodes in all corpus parse trees, then repetition of steps 204-205 ceases and the schema inference phase ceases, and merged tree 124 is fully populated and ready to use.

2.2 Message Compression Phase

Merged tree 124 may be treated as immutable (i.e. read only) during the message compression phase that performs steps 206-211. In a machine learning embodiment, the message compression phase is repeated with different messages in each phase of a machine learning lifecycle that has a sequence of phases that are a training phase followed by a validation phase followed by a production usage phase. In the training phase, steps 206-211 use messages in a training corpus that may or may not also be the schema inference corpus. In the validation phase, steps 206-211 use messages in a validation corpus that may or may not also be the schema inference corpus. In the production usage phase, steps 206-211 may or may not use new (e.g. a stream of live messages in flight) messages that did not occur in the schema inference corpus nor the training corpus nor the validation corpus and/or that did not exist during the schema inference phase nor the training phase nor the validation phase. In an embodiment without machine learning, the production usage phase is the only message compression phase.

Step 206 parses new message 113 into new parse tree 123. Based on trees 123 and 125, step 207 generates compressed message 115 by compressing new message 113 into compressed message 115.

As discussed earlier herein: a) in a natural language processing (NLP) embodiment, compressed message 115 is or contains sequence of tokens 170 or b) in an embodiment without NLP, sequence of tokens 170 is not implemented. Step 208 is: a) in an embodiment without NLP, not implemented or b) in an NLP embodiment, a sub-step of step 207. From the value of each leaf node 159-162, step 208 generates respective lexical token(s) in sequence of tokens 170.

Step 209 is a sub-step of step 208. In an embodiment, leaf values are strongly typed. For example in leaf node 161, the leaf value may be an integer that is, for example, two's complement encoded, which is not a lexical token. In the case of a numerically encoded leaf value, step 209 converts the number to text to generate lexical token(s). For example in leaf node 161, leaf value −1 may be converted into two lexical tokens—(i.e. minus sign) and 1. In another scenario, step 208 converts one integer 7,654,321 into five lexical tokens that include two comma tokens.

Thus depending on datatype and value, there may be significant incidental variations in how many lexical tokens are generated from each leaf value, and a count of lexical tokens may be more or less uncorrelated to a count of leaf nodes. For example, scenario-specific step 210 parses a second new message into a second new parse tree that consists of more tree nodes and/or more leaf nodes than new parse tree 123 contains and then generates, from the larger second new parse tree, a smaller second sequence of tokens that contains fewer tokens than sequence of tokens 170. Thus, a sequence of tokens is a variable-length array and, in that case, a downstream machine learning model should readily accept a variable-length sequence of tokens as input.

In other words, a compressed message is not a fixed-size encoding. Compared to another message, a message may have more or fewer tree levels in its parse tree, more or fewer tree nodes, more or fewer leaf nodes and, in its sequence of tokens, more or fewer lexical tokens, and all of those measurements may be orthogonal to each other. In other words compared to another message, a message may have more in one measurement and fewer in another measurement.

As discussed above, a machine learning embodiment may have a training phase such as for NLP. As discussed earlier herein, a sequence of tokens may contain a mix of tokens subsequences, some of which represent compressed data and some of which represent uncompressed data. These two kinds of tokens subsequences are respectively referred to herein as a compressed subsequence and an uncompressed subsequence, a compressed sequence of tokens may contain a mix of compressed and uncompressed subsequence(s). For example as shown, sequence of tokens 170 contains a compressed subsequence, which extends from token not to token 1, followed by an uncompressed subsequence that is the remainder of sequence of tokens 170.

Based on multiple compressed sequences of lexical tokens for multiple messages in a training corpus, step 211 trains a large language model (LLM) to accurately perform NLP inferencing, which may entail an NLP inferential activity such as generation of natural language (e.g. natural sentences) or, as presented in the related U.S. patent applications discussed in the Overview herein, classification or anomaly detection. Thus, the LLM may or may not be generative. In an embodiment without NLP, step 211 is not implemented or instead trains a non-NLP (i.e. not an LLM) machine learning model that accepts, as input, a compressed message that does not contain sequence of tokens 170.

3.0 Example Special Parsing Scenarios X-Z

Figure 3:
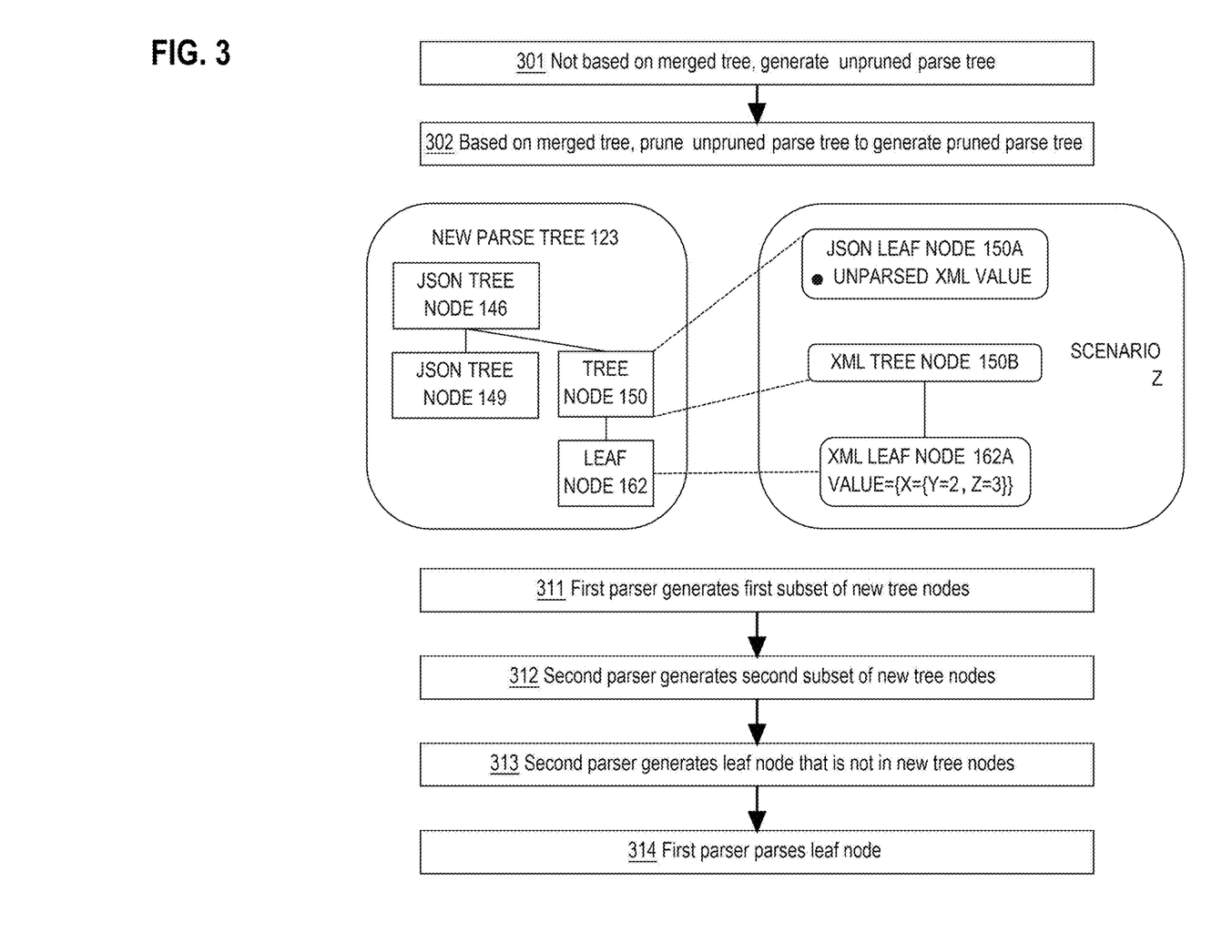
FIG. 3 has two flow diagrams that depict respective distinct example computer processes for specially generating a parse tree.

FIG. 3 has two flow diagrams that are a top flow diagram and a bottom flow diagram that depict distinct special parsing processes. For ease of demonstration, a simplified depiction of new parse tree 123 is shown in FIG. 3. Although not depicted as such, new parse tree 123 is identical in FIGS. 1 and 3. In other words for new parse tree 123, some tree nodes are logically present but nonetheless undepicted in FIG. 3, such as tree nodes 133, 145, 147-148, and 159-161 that are shown only in FIG. 1.

In example special parsing scenarios X-Z, new parse tree 123 is mutable and tree nodes can be removed and, in some cases, replaced with fewer or more new tree nodes. For example as discussed later herein, a tree node may have two instances that are generated at different times, and a newer instance replaces an older instance. As shown, scenario Z has instances of tree nodes 150A-B and 162A, and other scenarios X-Y do not have those particular instances even though scenarios X-Y use tree nodes 150 and 162.

3.1 Example Pruned Parsing Process

As discussed earlier herein, leaf node 162 contains a value that is unparsed JSON, and example scenarios X-Z specially generate or process an unparsed leaf value in distinct respective ways. In the following example scenarios X-Y, sequence of tokens 170 contains a mix of compressed and uncompressed subsequences as discussed earlier herein. In scenario X, computer 100 has a JSON parser but decides not to parse leaf node 162 (e.g. due to a tree path in new message 113 that does not occur in merged tree 125) as discussed earlier herein.

In scenario Y, new message 113 is an XML document that contains nested JSON, and an embodiment of computer 100 contains an XML parser but not a JSON parser, which means that leaf node 162, whose value is unparsed JSON, cannot be parsed, which may be a reason why sequence of tokens 170 contains a mix of compressed and uncompressed subsequences.

The following are two kinds of topological mutation of a parse tree that may, for example, change how many levels are in a tree. Flattening is replacing a pruned (i.e. removed) subtree (i.e. multiple tree nodes) with a single leaf node whose value is unparsed text in the message that corresponds to the subtree. The reverse of flattening is expanding that replaces a pruned leaf node with a subtree generated by parsing the leaf value.

The top flow diagram depicts, for scenario X, a top example process that consists of steps 301-302 that any computer herein may perform to prune a parse tree that contains tree path(s) that do not occur in merged tree 125 or tree paths whose length (i.e. depth, count of levels) exceeds a threshold. In scenario X, new message 113 may consist of a JSON document that is fully parsed by step 301 that, not based on merged tree 125, generates an unpruned parse tree that contains intermediate tree node 150. However instead of leaf node 162, the unpruned parse tree contains a subtree of multiple additional tree nodes that can be flattened (i.e. represented and replaced by leaf node 162) during pruning. FIGS. 1 and 3 show neither the unpruned parse tree nor its additional tree nodes.

Step 302 may detect that merged tree 125 does not contain the tree path of intermediate tree node 150 in the unpruned parse tree. In that case, step 302 may flatten the subtree of additional tree nodes to generate leaf node 162. For example, the value of leaf node 162 may be copied directly from new message 113. In that way based on merged tree 125, step 302 effectively prunes the unpruned parse tree to generate pruned new parse tree 123 that has, compared to the unpruned parse tree: fewer tree levels, fewer tree nodes, and/or fewer leaf nodes. Thus, the JSON parser operates only during step 301 and does so without the complication of using merged tree 125 that step 302 uses.

3.2 Example Multiple Parsers Process

In the following example scenario Z, new message 113 contains a mix of XML and JSON, and an embodiment of computer 100 contains a first parser that is a JSON parser and a second parser that is an XML parser. Herein, a tree node that is generated by the JSON parser is referred to as a JSON tree node, even if the JSON tree node is a leaf node whose value is unparsed XML. Likewise, a tree node that is generated by the XML parser is referred to as an XML tree node, even if the XML tree node is a leaf node whose value is unparsed JSON. In scenario Z, a mutable parse tree initially consists of JSON tree nodes but, by expansion that parses a previously unparsed leaf value, the parse tree becomes a mix of JSON and XML tree nodes as follows.

The shown dashed lines indicate the some tree nodes in new parse tree 123 may, at different times, have different instances in scenario Z. For example as shown, tree node 150 may initially be JSON leaf node 150A whose value is unparsed XML. The bottom flow diagram depicts, for scenario Z, a bottom example process that consists of steps 311-314 that any computer herein may perform to parse XML nested in JSON or JSON nested in XML or both.

In step 311, the JSON parser accepts whole new message 113 as input and responsively generates a JSON parse tree that consists of the first subset of tree nodes that are JSON tree nodes, including JSON tree nodes 146, 149, and 150A. JSON leaf node 150A's value is unparsed XML because the JSON parser cannot parse XML. Shown leaf node 162 does not exist during step 311 and will not be generated until later as discussed below.

Computer 100 detects that JSON tree node 150A is a leaf node whose value is unparsed XML. Responsively, the XML parser accepts the unparsed XML as input and generates an XML tree that consists of the second subset of tree nodes that are XML nodes generated by steps 312-313 as follows. Step 312 generates XML tree node 150B. Step 313 generates XML leaf node 162A whose value is unparsed JSON as shown because the XML parser cannot parse JSON. Computer 100 inserts the XML tree as a subtree into the JSON parse tree. To do this, computer 100 replaces JSON leaf node 150A with XML intermediate tree node 150B. Thus, the result of steps 312-313 is new parse tree 123 as shown in FIG. 3, including leaf node 162 whose value is unparsed JSON.

In step 314 in scenario Z, the JSON parser accepts, as input, the unparsed JSON that is the shown value of XML leaf node 162A and responsively generates a JSON subtree (not shown in FIGS. 1 and 3) that contains JSON tree nodes, including JSON tree node 162B (not shown) as the root of the JSON subtree and including JSON leaf nodes, that are not in the first subset of tree nodes that were JSON tree nodes already generated by step 311. Step 314 inserts the JSON subtree into new parse tree 123 by replacing shown XML leaf node 162A with unshown JSON intermediate tree node 162B in a way that is similar to insertion by replacement already performed by step 312.

In an embodiment, step 314 is conditional and may not occur if computer 100 has a heuristic that, for example, may decide not to parse a subtree when: a) a tree level in a parse tree or in a nested subtree exceeds a threshold or b) a nesting pattern occurs (e.g. JSON nested within XML, which is not the same thing as XML nested within JSON).

The result of three parsings by two parsers in steps 311-314 is a final parse tree that contains a mix of JSON tree nodes and XML tree nodes and that mix of tree nodes may or may not consist solely of parsed tree nodes. A compressed message may be generated based on the final mixed parse tree. The compressed message may contain a sequence of tokens that contains a mix of tokens subsequence(s) that represent JSON and tokens subsequence(s) that represent XML. In scenario Z, the final mixed parse tree contains no leaf node whose value is unparsed. In that case, the mixed sequence of tokens consists solely of compressed subsequences and no uncompressed subsequences as discussed earlier herein.

In other words in scenario Z, the sequence of tokens is fully compressed despite containing a mix of tokens from JSON and XML. The sequence of tokens may, for example, not indicate which tokens came from JSON and which tokens came from XML and, for example, the downstream application might not care which tokens came from JSON and which tokens came from XML. For example, the downstream application might be unaware that a compressed message was generated from a message that contained JSON or XML or a mix of both.

Likewise, the generation of merged tree 125 during the schema inference phase and the use of merged tree 125 during the message compression phase does not depend on which of messages 111-113 contain JSON or XML or a mix of both. For example, merge analytics and compression analytics herein do not depend on whether a tree path contains JSON tree nodes or XML tree nodes or a mix of both. For example herein, a purely JSON document and a purely XML document may both contain a same tree path and may, if they contain identical sets of key-value pairs, have identical compressed messages. That is, two distinct parsers may each be based on a respective distinct only one grammar, and the two parsers may parse respective distinct messages that may, in some cases, have identical compressed messages.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
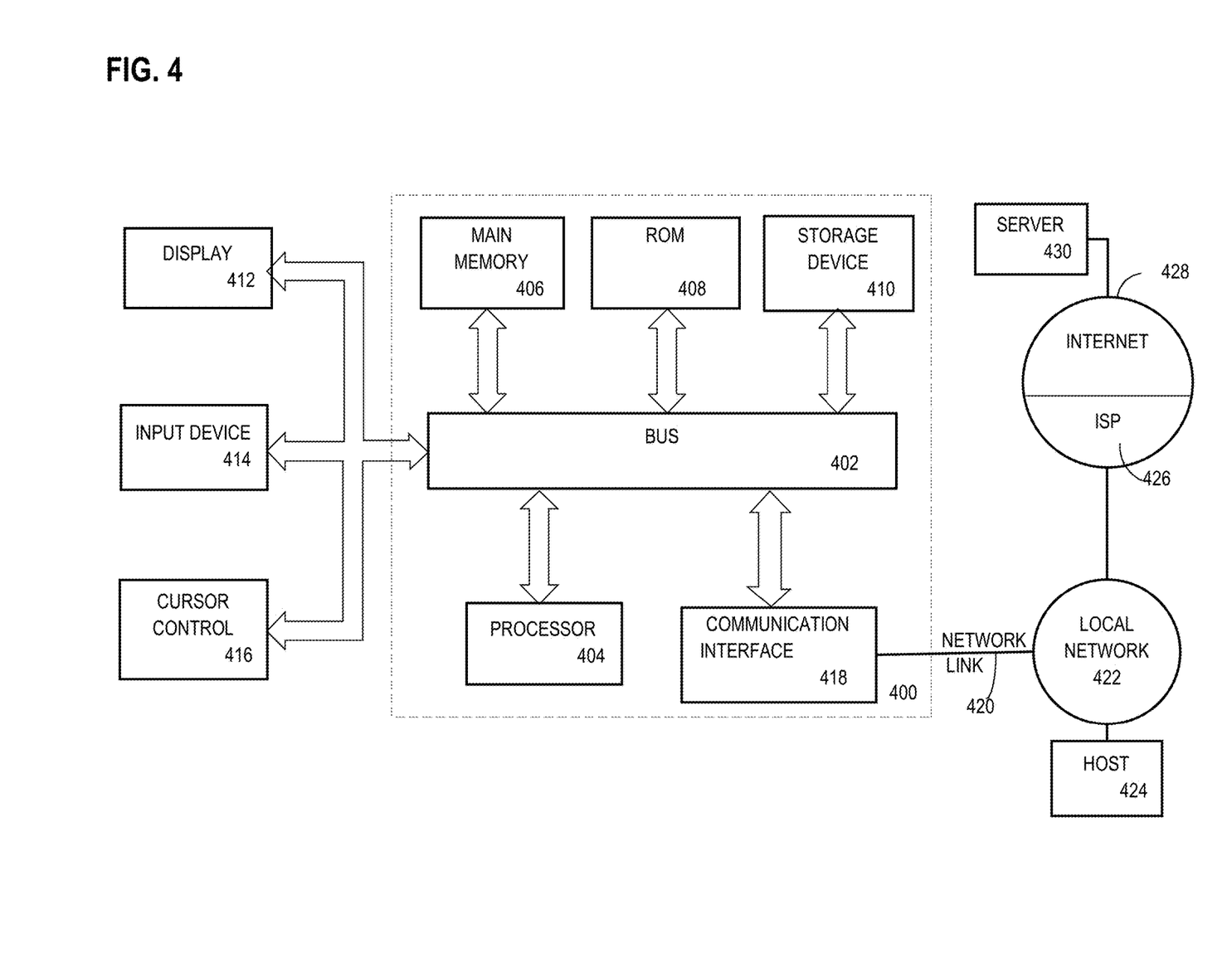
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
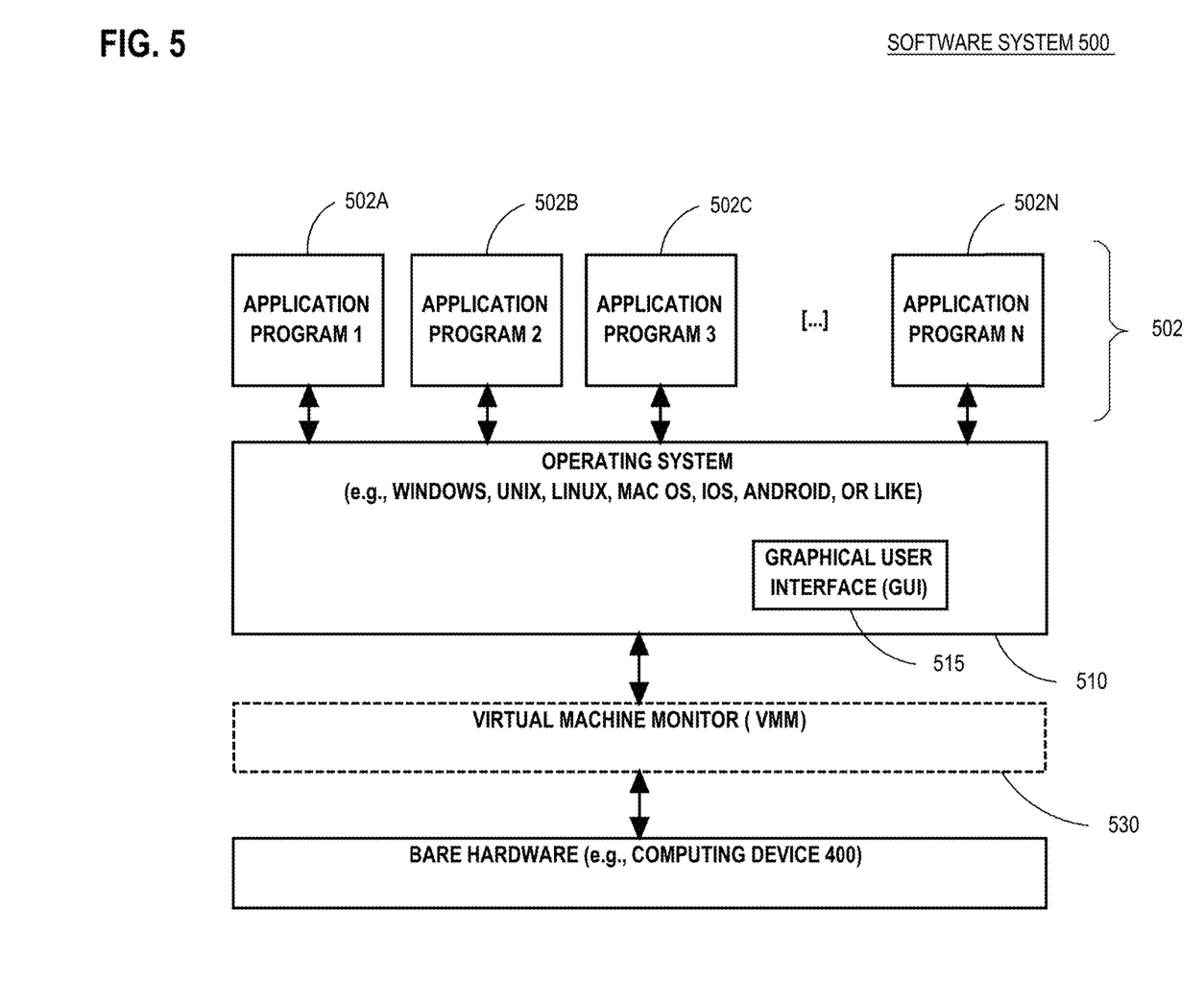
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating a plurality of parse trees that include a first parse tree that represents a first message and a second parse tree that represents a second message, wherein:
the plurality of parse trees comprises a sequence of tree levels and a plurality of tree nodes,
each tree node of the plurality of tree nodes is contained in exactly one parse tree of the plurality of parse trees,
each tree node of the plurality of tree nodes that is a leaf node contains a value, and
each tree node of the plurality of tree nodes that is not a leaf node contains a key;
generating a merged tree by performing without processing the plurality of tree nodes that are leaf nodes:
first merging, into a first merged node in a first tree level, a tree node of the plurality of tree nodes in the first tree level that contains a first key, and
second merging, into a second merged node in a second tree level, a tree node of the plurality of tree nodes in the second tree level that contains a second key, wherein said performing has at least one capability selected from a group consisting of:
the first tree level and the second tree level can be identical, and
the first key and the second key can be identical;
parsing a new message into a new parse tree that consists of a new plurality of tree nodes; and
compressing, based on the new parse tree and the merged tree, the new message into a compressed message.

2. The method of claim 1 wherein the compressed message consists of a sequence of lexical tokens.

3. The method of claim 2 further comprising training, based on the sequence of lexical tokens, a large language model (LLM).

4. The method of claim 2 wherein:
the new plurality of tree nodes comprises a plurality of leaf nodes;
the method further comprises generating, from the value of each leaf node of the plurality of leaf nodes, a lexical token in the sequence of lexical tokens;
generating from a particular leaf node of the plurality of leaf nodes comprises generating multiple lexical tokens.

5. The method of claim 4 wherein:
said particular leaf node is a first particular leaf node;
the value of a second particular leaf node of the plurality of leaf nodes is a number;
generating from the second particular leaf node comprises converting the number to text.

6. The method of claim 2 wherein:
said new message is a first new message;
said new parse tree is a first new parse tree;
said new plurality of tree nodes is a first new plurality of tree nodes;
said sequence of lexical tokens is a first sequence of lexical tokens;
the method further comprises:
parsing a second new message into a second new parse tree that consists of a second new plurality of tree nodes that contains more tree nodes than the first new plurality of tree nodes;
generating, based on the second new plurality of tree nodes, a second sequence of lexical tokens that contains fewer lexical tokens than the first sequence of lexical tokens.

7. The method of claim 1 wherein:
said sequence of tree levels includes a first amount of tree levels;
the new parse tree consists of a second sequence of tree levels that includes a second amount of tree levels that is less than the first amount of tree levels.

8. The method of claim 7 wherein said parsing the new message comprises:
a first parser generating a first subset of the new plurality of tree nodes;
a second parser generating a second subset of the new plurality of tree nodes.

9. The method of claim 8 wherein:
the second subset of the new plurality of tree nodes contains a leaf node;
the first parser is capable of parsing the leaf node into a plurality of new tree nodes;
the method does not comprise parsing the leaf node.

10. The method of claim 8 wherein:
the method further comprises the second parser generating a leaf node that is not in the new plurality of tree nodes;
said generating the first subset of the new plurality of tree nodes comprises the first parser parsing the leaf node.

11. The method of claim 1 wherein:
said new parse tree is pruned parse tree;
said parsing the new message comprises:
generating, not based on the merged tree, an unpruned parse tree, and
pruning, based on the merged tree, the unpruned parse tree to generate the pruned parse tree.

12. The method of claim 11 wherein at least one condition selected from a group consisting of:
the unpruned parse tree contains more tree levels than the pruned parse tree,
the unpruned parse tree contains more tree nodes than the pruned parse tree, and
the unpruned parse tree contains more leaf nodes than the pruned parse tree.

13. The method of claim 11 wherein:
the unpruned parse tree contains a subtree;
said pruning comprises replacing the subtree with a leaf node that represents the subtree.

14. The method of claim 1 wherein:
the method further comprising exceeding of a threshold by a count of said plurality of tree nodes in the first tree level that contain the first key;
said first merging is responsive to said exceeding.

15. The method of claim 1 wherein the compressed message does not contain a key of a tree node.

16. The method of claim 1 wherein the compressed message consists essentially of values of the new plurality of tree nodes that are leaf nodes.

17. The method of claim 1 wherein:
the merged tree contains a merged amount of distinct keys;
each parse tree in the plurality of parse trees contains an amount of distinct keys that is less than the merged amount of distinct keys.

18. The method of claim 1 wherein the new message comprises at least one selected from a group consisting of: JavaScript object notation (JSON), extensible markup language (XML), hypertext markup language (HTML), a stylesheet, JavaScript, Python, a Python notebook, unencoded binary data, and a body of a hypertext transfer protocol (HTTP) post.

19. The method of claim 1 wherein a key of a particular tree node of the plurality of tree nodes that is not a leaf node comprises an HTML tag or an XML tag.

20. The method of claim 1 wherein:
said parsing the new message is based on a grammar;
said compressed message is a first compressed message;
the method further comprises:
parsing, not based on the grammar, a second new message;
compressing the second new message into a second compressed message that is identical to the first compressed message.

21. One or more non-transitory computer-readable media storing instructions that, when executed by one or more processors, cause:
generating a plurality of parse trees that include a first parse tree that represents a first message and a second parse tree that represents a second message, wherein:
the plurality of parse trees comprises a sequence of tree levels and a plurality of tree nodes,
each tree node of the plurality of tree nodes is contained in exactly one parse tree of the plurality of parse trees,
each tree node of the plurality of tree nodes that is a leaf node contains a value, and
each tree node of the plurality of tree nodes that is not a leaf node contains a key;
generating a merged tree by performing without processing the plurality of tree nodes that are leaf nodes:
first merging, into a first merged node in a first tree level, a tree node of the plurality of tree nodes in the first tree level that contains a first key, and
second merging, into a second merged node in a second tree level, a tree node of the plurality of tree nodes in the second tree level that contains a second key, wherein said performing has at least one capability selected from a group consisting of:
the first tree level and the second tree level can be identical, and
the first key and the second key can be identical;
parsing a new message into a new parse tree that consists of a new plurality of tree nodes; and
compressing, based on the new parse tree and the merged tree, the new message into a compressed message.

22. The one or more non-transitory computer-readable media of claim 21 wherein the compressed message consists of a sequence of lexical tokens.

23. The one or more non-transitory computer-readable media of claim 21 wherein:
said sequence of tree levels includes a first amount of tree levels;
the new parse tree consists of a second sequence of tree levels that includes a second amount of tree levels that is less than the first amount of tree levels.

24. The one or more non-transitory computer-readable media of claim 23 wherein said parsing the new message comprises:
a first parser generating a first subset of the new plurality of tree nodes;
a second parser generating a second subset of the new plurality of tree nodes.

25. The one or more non-transitory computer-readable media of claim 21 wherein:
said new parse tree is pruned parse tree;
said parsing the new message comprises:
generating, not based on the merged tree, an unpruned parse tree, and
pruning, based on the merged tree, the unpruned parse tree to generate the pruned parse tree.

* * * * *